US005747590A

United States Patent [19]
Corcoran et al.

[11] Patent Number: 5,747,590
[45] Date of Patent: May 5, 1998

[54] ACRYLIC-MELAMINE-FUNCTIONALIZED OLIGOMER COATING COMPOSITION

[75] Inventors: Patrick Henry Corcoran, Cherry Hill; Isidor Hazan, Clementon, both of N.J.; Sapé Kwesi Quashie, Wilmington, Del.

[73] Assignee: E. I. du Pont de Nemours and Company, Wilmington, Del.

[21] Appl. No.: 758,831

[22] Filed: Dec. 4, 1996

[51] Int. Cl.$^6$ .................................................. C08L 61/28
[52] U.S. Cl. .................. 525/155; 524/516; 524/517; 525/161; 525/162; 525/163; 525/187
[58] Field of Search .................................. 525/155, 161, 525/187, 162, 163

[56] References Cited

U.S. PATENT DOCUMENTS

| | | | |
|---|---|---|---|
| 4,187,382 | 2/1980 | Cowherd, III et al. | 560/185 |
| 4,591,533 | 5/1986 | Antonelli et al. | 428/520 |
| 5,066,698 | 11/1991 | Hazan et al. | 524/269 |
| 5,270,398 | 12/1993 | Mori et al. | 525/327.3 |

*Primary Examiner*—Fred Zitomer
*Attorney, Agent, or Firm*—James A. Costello

[57] ABSTRACT

An improved coating composition having particularly good mar resistance when applied to an automotive surface, the composition comprising acrylic polymer(s), melamine, and a crosslinkable, aliphatic oligomer having a weight average molecular weight not exceeding about 3,000.

17 Claims, No Drawings

ACRYLIC-MELAMINE-FUNCTIONALIZED OLIGOMER COATING COMPOSITION

BACKGROUND OF THE INVENTION

The present invention relates to a curable coating composition particularly useful as a topcoat in multi-layered coating systems.

Basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for coating formulations which provide an outstanding balance of performance characteristics after application, particularly mar-resistance. Heretofore, mar-resistant coatings were attained by softening the coating, which depreciates other performance characteristics. The instant invention overcomes this problem and is an improvement in the coating composition described in U.S. Pat. No. 4,591,533.

SUMMARY OF THE INVENTION

In a coating composition which, when dry, has measurable values of hardness and mar resistance, comprising an organic liquid carrier and a film-forming binder formed from (i) an acrylic polymer, I, of monomers of alkyl methacrylate, allyl acrylate, hydroxy alkyl acrylate or methacrylate, and having a weight average molecular weight of about 3,000 to 20,000;

(ii) a self-stabilized dispersed resin formed by polymerizing the following constituents:

(a) an acrylic polymer, II, of monomers comprising alkyl methacrylate, alkyl acrylate, hydroxy alkyl acrylate or methacrylate, or an ethylenically unsaturated carboxylic acid, and having a weight average molecular weight of about 3,000 to 20,000; and (b) monomers of alkyl methacrylate, alkyl acrylate, hydroxy alkyl acrylate or methacrylate; wherein acrylic polymer, II, contains glycidyl methacrylate or acrylate monomers post-reacted with the carboxylic acid, or, the monomers contain glycidyl methacrylate or acrylate; and (iii) an alkylated melamine formaldehyde crosslinking agent; the improvement which comprises replacing at least 5% by weight of (i) with at least one crosslinkable, aliphatic oligomer having a weight average molecular weight not exceeding about 3,000;

whereby the mar resistance of the resulting dry coating is improved to at least about 85 percent, as measured by the 'rub-abrasion test', while maintaining a hardness value of at least about 9 knoop.

The preferred oligomer substitution for acrylic component, (I), is an adduct of epsilon caprolactone (6-hexanolactone, 2-oxepanone) and 1,3,5-tris(2-hydroxyethyl) cyanuric acid. This adduct is referred to hereafter as the "caprolactone adduct".

Other polyhydroxyl oligomers can be used in place of all or part of the caprolactone adduct and one skilled in the art will know how to select such oligomer(s) based on the teaching provided herein. For example, adducts can be used that are polyester reaction product(s) of a multifunctional alcohol such as pentaerythritol, trimethylolpropane, hydrogenated bisphenol A, hexanediol, or cyclohexane dimethanol, reacted with a monomeric anhydride such as hexahydrophthalic anhydride, the reaction product then further reacted with a monofunctional epoxy (oxirane) such as butylene oxide, propylene oxide, or the like.

This invention also concerns a process for preparing a substantially colorless coating composition which is employable as the clearcoat of this invention. The process comprises adding to the composition from 0.1 to 2 percent of a phosphorus-containing compound such as 9,10-dihydro-9-oxa-10-phosphaphenanthrene-10-oxide and/or triphenyl phosphite, by weight of the solids content of the oligomeric adduct.

The term "aliphatic" is employed herein to include aliphatic and cycloaliphatic materials. The term "crosslinkable" means that the individual components of the adduct contain functionality which react within the composition of the invention to give a coating of good appearance, durability, hardness and mar resistance. Average component functionalities are greater than 1, preferably greater than 2. In preferred compositions, the substitute adducts comprise ratios of lactone to isocyanurate of 6:1 to 1:2, preferably 3–5:1; most preferred is 4:1. The 'rub-abrasion test' is defined in Example 1.

DETAILS OF THE INVENTION

The coating composition has a film-forming binder content of about 20–85% by weight and correspondingly about 15–80% by weight of a liquid carrier. Preferably, the coating composition is a high solids composition that contains about 50–80% by weight of the binder and 20–50% by weight of organic solvent for the binder. The binder of the composition preferably is a blend of about 5–75% by weight of an 1.5 acrylic polymer I, and 5–45% by weight of a self-stabilized dispersed resin and 20–50%, by weight of an alkylated melamine formaldehyde crosslinking agent.

The acrylic polymer I is of polymerized monomers of an alkyl methacrylate, an alkyl acrylate, hydroxy alkyl acrylate or methacrylate and has a weight average molecular weight of about 3,000–20,000. Preferably, styrene is used with the above monomers in acrylic polymer I.

Typical alkyl methacrylate used to form the acrylic polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Typical alkyl acrylates used to form the acrylic polymer are methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Typical hydroxy alkyl acrylates and methacrylates are hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate and the like and mixtures of the above monomers.

Preferably, the acrylic polymer I is composed of 5–30% by weight butylacrylate, 15–50% by weight of hydroxyethyl acrylate or hydroxy propyl acrylate and has a weight average molecular weight of about 5,000–15,000. Optionally, the polymer can contain about 0.1–5% by weight of acrylic acid or methacrylic acid.

The acrylic polymer I is prepared by solution polymerization in which the monomers, conventional solvents, polymerization initiators, such as peroxy acetate are heated to about 90°–250° C. for 1–6 hours.

The self-stabilized dispersed resin is formed by polymerizing in solution the following constituents:

(1) an acrylic polymer II;

(2) monomers of alkyl acrylate, allyl methacrylate, and hydroxy acrylate or methacrylate.

Conventional solvents and polymerization initiators such as t-butyl peracetate are used. The constituents are heated to about 80°–250° C. for about 1–6 hours to form the resin.

The solution acrylic polymer II is composed of polymerized monomers of alyl methacrylate, alkyl acrylate, hydroxy alkyl acrylate or methacrylate and an ethylenically unsaturated carboxylic acid and optionally, monomers of styrene. Any of the aforementioned alkyl acrylates, methacrylates, hydroxy alkyl acrylates or methacrylates can be used to prepare the polymer. Typical ethylenically unsaturated carboxylic acids that can be used are acrylic acid and methacrylic acid. Preferably, styrene is used to form the polymer with the above monomers.

One preferred polymer contains about 5–25% by weight styrene, 20–40% by weight butyl acrylate, 20–40% butyl methacrylate, 5–15% by weight hydroxy ethyl acrylate, 1–5% by weight acrylic acid and 10–20% by weight ethyl methacrylate and has a weight average molecular weight of about 7,000–15,000.

Another preferred polymer contains about 5–25% by weight styrene, 25–35% by weight butyl methacrylate, 20–40% by weight butyl acrylate, 5–15% by weight hydroxy ethyl acrylate, 1–5% by weight acrylic acid, 10–20% by weight ethyl methacrylate and 1–5% by weight glycidyl methacrylate post reacted with acrylic acid and has a weight average molecular weight of about 7,000–15,000.

Conventional polymerization techniques as described above for acrylic Polymer I are used to prepare acrylic Polymer II.

Glycidyl methacrylate or acrylate is either post reacted with the carboxyl groups of acrylic polymer II or is one of the monomers that are polymerized with acrylic polymer II.

Any of the aforementioned alkyl acrylates or methacrylates, ethylenically unsaturated acids are monomers that can be used to prepare the self stabilized/dispersed resin. Other useful monomers are styrene, acrylonitrile, methacrylonitrile, acrylamide, methacrylamide, perfluoro alkyl methacrylates or acrylates, dicarboxylic acids such as itaconic acid and the like.

Typical solvents and diluents are used to form the above polymers and the resulting coating composition. Appropriate solvents are chosen to form polymer solutions or dispersions and appropriate diluents are chosen to form coating compositions. Typical solvents and diluents are toluene, xylene, butyl acetate, acetone, methyl isobutyl ketone, methyl ethyl ketone, methanol, isopropanol, butanol, hexane, acetone, ethylene glycol monoethyl ether, naphtha, mineral spirits, heptane and other aliphatic, cycloaliphatic, aromatic hydrocarbons, esters, ethers and ketones.

The crosslinking agents used in the composition is a fully alkylated melamine formaldehyde resin that preferably is a methylated and butylated melamine formaldehyde resin that has a degree of polymerization of about 1–3. Generally, this melamine formaldehyde resin contains about 50% butylated groups and 50% methylated groups. Typically these crosslinking agents have a number average molecular weight of about 300–600 and a weight average molecular weight of about 500–1500.

It is possible to use other alkylated melamiine formaldehyde crosslinking agents. Typically lower alkyl alcohols are used to form these crosslinking agents such as methanol, ethanol, propanol, isopropanol, butanol, isobutanol, hexanol and the like. Also, urea formaldehyde, benzoguanamine formaldehyde and polyisocyanates can be used as crosslinking agents.

A preferred coating composition contains
  (i) about 5–75%, by weight of a solution of a 5–50% weight ratio of the caprolactone: 50–95% of acrylic polymer I which comprises 5–30% by weight of styrene, 10–40% by weight of butyl methacrylate, 10–40% by weight of butyl acrylate, 15–50% by weight of hydroxy ethyl acrylate or hydroxy propyl acrylate; polymer I having a weight average molecular weight of about 5,000–15,000; and
  (ii) 5–45% by weight of a self-stabilized dispersion resin formed by polymerizing the following constituents:
    (a) an acrylic solution Polymer II composed of 5–25% by weight styrene, 20–40% by weight butyl acrylate, 20–40% by weight butyl methacrylate, 5–15% by weight hydroxy ethyl acrylate, 1–5% by weight acrylic acid 10–20% by weight ethyl methacrylate and having a weight average molecular weight of about 7,000–15,000 and
    (b) monomers of styrene, methyl methacrylate hydroxy ethyl acrylate, methacrylic acid, methyl acrylate and glycidyl methacrylate;
  wherein the carboxyl groups of the acrylic acid are post-reacted with glycidyl methacrylate and
  (iii) 25–50% by weight of a fully methylated and butylated melamine formaldehyde crosslinking agent.

Preferred oligomer adduct substitutions in component (i) are typically maintained at about 50% or less.

Generally, an acid catalyst is used in the coating composition to enhance crosslinking of the components on curing. About 0.1–2% by weight, based on the weight of the composition, of catalyst can be used. Typically, blocked aromatic sulfonic acids are used. One preferred blocked acid catalyst is dodecyl benzene sulfonic acid blocked with dimethyl oxazolidine. Other acid catalysts that can be used are sulfonic acid, para-toluene sulfonic acid, dinonyl naphthalene sulfonic acid and the like.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclbenzo-phenone, 2,4-dihydroxybenzophenone, hydroxy-benzo-phenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2', 4-trihydroxy-4'-alkoxybenzophenone, 2-hydroxy-4-methoxy-2'carboxybenzophenone;

Triazoles such as 2-phenyl-4-(2'-4'-dihydroxybenzoyl) triazoles, substituted benzotriazoles such as hydroxyphenyltriazoles such as 2-(2'hydroxy-5'-methyphenyl benzotriazole, 2-(2'hydroxyphenyl)benzo-triazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylol-propane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylakanoic acid esters of di- and tri- pentaerythritol, phenyl- and naphthalene- substituted oxalic acid diamides, methyl-β-(3, 5-di-t-butyl-4-hydroxyphenyl)propionate, α,α-bis(2-hydroxy-phenyl)diisopropylbenzene, 3,5'-dibromo-2'-hydroxy-acetophenone, ester derivatives of 4,4-bis(4'-hydroxy-phenyl)pentaonic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, α-cyano-β,β-diphenylacrylic acid derivatives, bis(2-benzoxazolyl)alkanes, bis(2-naphoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycoumarone, 8-acetyl-3-dodecyl-7,7,9,9-tetramethyl-1,3-8-triaza-spiro(4,5)decanol-2,4-dione.

Particularly useful ultraviolet light stabilizers that can be used are hindered amines of piperidyl derivatives and nickel compounds such as [1-phenyl-3-methyl-4-decanoylpyrazolate(5)]-Ni, bis[phenyldithiocarbamato]-Ni (II), and others that will be obvious to one skilled in the art. The following blend of ultraviolet light stabilizers is particularly preferred 2-[2'-hydroxy-3',5'-1(1-1-dimethylpropyl)phenyl]benzo-triazole and bis-[4-(1,2,2,6,6-pentamethylpiperidyl)] 2-butyl-2-[(3,5-t-butyl-4-hydroxyphenyl)methyl]propanedioate.

Another useful blend of ultraviolet light stabilizers is 2-(benzotriazole-2-VL)-4,6-bis(methylethyl-1-phenyl ethyl) phenol, and 2-(3-hydroxy-3,5'-di-tert amyl phenyl) benzotriazole.

Generally, the clear coating composition of this invention is applied by conventional spraying techniques to a color or base coat of an automobile or truck and then baked. Preferably, electrostatic spraying is used to apply the composition. The coatings are baked at about 80° to 200° C. for about 10 to 60 minutes. The resulting clear coat is about 1–5 mils thick preferably 1–2 mils thick and has excellent gloss, good adhesion to the color coat and excellent weatherability.

In the following Examples, all parts and percentages are on a weight basis unless otherwise indicated. The weight average molecular weight of polymers was determined by GPC (gel permeation chromatography) using polystyrene as a standard. Mar and scratch resistance are ultimately judged by visual perception. In order to provide quantitative comparisons in use, an image analysis method was employed to evaluate a standardized surface damage technique. The damage was effected using a grit slurry, which mimics car wash damage. This kind of damage is one of the major finish complaint areas in the automotive business. The relation between the image analysis result and visual perception is non-linear. For example, an image analysis reading of 95% is acceptable but a coating having a comparative reading of 72% would have very poor appearance.

EXAMPLE 1

A paint is formulated by blending together the following constituents:

1. Methylated/butylated melamine-formaldehyde resin, Cymel® 1168 from Cytec Industries/44.26 grams.

2. Methylated/butylated melamine-formaldehyde resin, Resimene® RF-4514 from Monsanto Chemicals/ 61.82 grams.

3. Microgel from "Procedure" that follows/24.17 grams.

4. Silica dispersion from "Procedure" that follows/51.75 grams.

5. Stabilizer Package from "Procedure"/29.4 grams.

6. Acrylic Polyol Resin from "Procedure" that follows/ 72.02 grams.

7. Caprolactone additive from "Procedure"/53.38 grams.

8. Non-aqueous dispersion (NAD) from "Procedure" that follows/98.46 grams.

9. Methanol/3.68 grams.

10. Butanol/15.32 grams.

11. Ethylene Glycol Monobutyl ether acetate/14. 10 grams.

12. Catalyst Solution/9.6 grams. This solution consists of Cycol® 600 (Sulfonic acid from American Cyananide) 48%, AMP-95® (Amine from Angus Chemical) 11% and methanol 41%.

This coating was sprayed over a black solvent-borne base coat, which was not previously cured. The coating was cured for 30 minutes at 141° C. (285° F.). The coating exhibited comparable hardness and significantly better mar resistance than any equivalent coating made without the adduct.

| Property | With Adduct | Without Adduct |
|---|---|---|
| Hardness | 11.5 knoop | 13.2 knoop |
| Mar Resistance[1] | 95.4% | 72.7% |

[1] The surface of a panel is marred in a "Rub-Abrasion Test" using a 3% slurry of aluminum oxide in water and a felt pad, the marring is accomplished using a Daiei ® Rub Tester. The test uses 10 cycles with a weight of 500 grams. The rating shown is the percent of the surface which is not marred as measured by image analysis.

PROCEDURES

Oligomeric Adduct

The following constituents were charged to a reactor equipped with a thermometer, stirrer, nitrogen purge and condenser.

| Portion I | Parts by Weight | Mol Ratio |
|---|---|---|
| Epsilon-caprolactone | 597.9 | 4 |
| 9,10-dihydro-9-oxa-10-phosphaphenanthrene-10-oxide | 9.4 | — |
| 1,3,5-tris(2-hydroxyethyl)cyanuric acid | 342.2 | 1 |
| dibutyltindilaurate | 0.2 | — |
| methylethylketone | 34.2 | — |

These ingredients were heated to 125° C. with mixing; the batch exothermed to 140° C. and was held at 140° C. for 8 hours. The batch was cooled and filled out. The solids was 96.5%; the viscosity was 3125 centipoises; the APHA color was 20.

Microgel

A dispersed polymer microgel was prepared by charging the following constituents into a polymerization reactor equipped with a heat source and a reflux condenser.

|  | Parts by weight |
|---|---|
| Portion I | |
| Mineral Spirits (b.p. 157–210° C.) | 97.614 |
| Heptane | 37.039 |
| 2,2'-azobis(2-methylbutanenitrile) | 1.395 |
| Methacrylate copolymer | 4.678 |
| Stabilizer Methylmethacrylate monomer | 15.187 |
| Portion II | |
| Methyl methacrylate monomer | 178.952 |
| Styrene monomer | 75.302 |
| Hydroxyethyl acrylate monomer | 23.455 |
| Mineral spirits (b.p. range 157–210° C.) | 32.387 |
| Heptane | 191.896 |
| N,N-dimethylethanolamine | 1.108 |
| Glycidyl methacrylate monomer | 2.816 |
| Methacrylate copolymer stabilizer | 58.271 |
| Methacrylic acid monomer | 2.816 |
| Portion III | |
| Toluene | 12.938 |
| Heptane | 30.319 |
| 2,2'-azobis(2-methylbutanenitrile) | 2.024 |
| Portion IV | |
| Heptane | 16.204 |
| Portion V | |
| | 246.300 |
| Methylated/butylated melamine formaldehyde resin | |
| TOTAL | 1067.300 |

Portion I was charged to the reaction vessel and heated to its reflux temperature. It was held at reflux for 60 minutes. Then portions II and III were added simultaneously over a 180-minute period, while maintaining the resulting reaction mixture at its reflux temperature. Then portion IV was added to the reactor and the reaction mixture was held at reflux for 120 minutes. Excess solvent (246.3 parts) was then stripped off and the reactor contents cooled to 215° F. After cooling, portion V was added and mixed 30 minutes while continuing to cool to 140° F. The resulting dispersion was at 70.0% weight solids.

Silica Dispersion

A dispersion consisting of 39.8% of n-butyl alcohol, 47.7% of Cymel® 1133, a methylated/butylated melamine resin purchased from Cytec Industries, and 12.5% of an amorphous fumed silica, "Aerosil R-972", produced by Degussa Inc.

Acrylic Polyol Resin

A polymer solution was prepared by charging the following constituents into continuous stirred tank polymerization reactors equipped with heat sources and reflux condensers.

|  | Parts by Weight |
|---|---|
| Portion I | |
| Hydroxypropyl monomer | 232.300 |
| Isobutyl methacrylate monomer | 132.800 |
| Styrene monomer | 199.100 |
| Butyl acrylate monomer | 99.600 |
| Aromatic Hydrocarbon | 30.800 |
| (b.p. range 155–177° C.) | |
| Portion II | |
| t-Butylperoxyacetate | 56.440 |
| Aromatic Hydrocarbon | 105.400 |
| (b.p. range 155–177° C.) | |
| Portion III | |
| t-Butylperoxyacetate | 4.980 |
| Aromatic Hydrocarbon | 9.300 |
| (b.p. range 155–177° C.) | |
| Portion IV | |
| t-Butylperoxyacetate | 4.980 |
| Aromatic Hydrocarbon | 9.300 |
| (b.p. range 155–177° C.) | |
| TOTAL | 885.000 |

Resin was charged to each reactor of a continuous stirred tank polymerization system to 10% of capacity. The reactors were then heated under pressure to the following specifications: $R^1$=190° C., 20 psi, $R^2$=155° C., 15 psi and $R^3$=133° C., atmospheric pressure. Feed of each portion and transfers between reactors were then initiated. Portion I was fed to $R^1$ at a flow rate of 6.64 parts/minute. Portion II was fed to $R^1$ at a flow rate of 1.541 parts/minute. Portion III was fed to $R^2$ at a rate of 0.136 parts/minute and portion IV was fed to $R^3$ at a rate of 0.136 parts/minute. The final product was continuously transferred from $R^3$ to a storage tank. The resulting acrylic polyol resin was at 80.0% weight solids.

Stabilizer

The stabilizer additive is made in the following way. Add to 66 parts by weight of xylene: 13 parts by weight of Tinuvin® 0792, a hindered amine light stabilizer; 7 parts by weight of Tinuvin® 1130, an ultraviolet screener; 6 parts by weight of Tinuvin® 440, a hindered amine light stabilizer; 5 parts by weight of Tinuvin® 900, an ultraviolet screener; where all the Tinuvin® components are obtained from Ciba Geigy.

Non-aqueous Dispersion

To a 5-liter flask fitted with an agitator, thermometer, condenser and addition funnels was added the following ingredients. The mixture was agitated under nitrogen and temperature raised to reflux (100° to 104° C.). Ingredients are given in parts by weight (to the nearest whole number, for most). The dispersed polymer is 63.5% weight solids in toluene having a weight average molecular weight of 8100. The composition was as follows:

| STY/BA/BMA/HEA/MAA/GMA (14.7/43.6/27.5/10.1/2.3/1.7) | |
|---|---|
| dispersed polymer | 206 |
| isopropanol | 12 |
| spirits | 94 |
| heptane | 53 |
| butanol | 3 |

Added as a shot at reflux was t-butyl peroctoate (0.5 parts) and mineral spirits (5 parts). Then, the following ingredients were added over a 210 minute period at reflux:

| | |
|---|---|
| styrene | 52 |
| hydroxy ethylacrylate | 86 |
| methyl methacrylate | 126 |
| glycidyl methacrylate | 5 |
| methacrylic acid | 14 |
| methyl acrylate | 62 |
| dispersed polymer | 103 |

These ingredients were added next and the reaction held for 45 minutes:

| | |
|---|---|
| butanol | 12 |
| heptane | 17 |
| t-butyl peroctoate | 5 |
| mineral spirits | 31 |

Butanol (16 parts) and t-butyl peroctoate (1.7 parts) were then added over a 30 minute period and the reaction was held for 60 minutes. Finally, the reactor was stripped of 76 parts of solvent. The particle size was 298 nm as measured by quasielastic light scattering and had a room temperature viscosity of 2000 centipoise at 5 rpm on a Brookfield viscometer and a weight solids of 63.5 percent.

We claim:

1. In a coating composition which, when dry, has measurable values of hardness and mar resistance, comprising an organic liquid carrier and a film-forming binder formed from
   (i) an acrylic polymer, I, of monomers selected from the group consisting of alkyl methacrylate; alkyl acrylate; and hydroxy alkyl acrylate or methacrylate; and having a weight average molecular weight of about 3,000 to 20,000;
   (ii) a self-stabilized dispersed resin formed by polymerizing the following constituents:
      (a) an acrylic polymer, II, of monomers selected from the group consisting of alkyl methacrylate; alkyl acrylate; hydroxy alkyl acrylate or methacrylate; and ethylenically unsaturated carboxylic acid, and having a weight average molecular weight of about 3,000 to 20,000; and
      (b) monomers selected from the group consisting of alkyl methacrylate; alkyl acrylate; and hydroxy alkyl acrylate or methacrylate; wherein acrylic polymer, II, contains a monomer selected from the group consisting of glycidyl methacrylate; glycidyl acrylate; glycidyl methacrylate post-reacted with the carboxylic acid and glycidyl acrylate post-reacted with the carboxylic acid; and
   (iii) an alkylated melamine formaldehyde crosslinking agent;
   the improvement which comprises replacing at least 5% by weight of (i) with at least one crosslinkable, aliphatic oligomer having a weight average molecular weight less than 3,000;
whereby the mar resistance of the resulting dry coating is improved to at least about 85 percent, as measured by the 'rub-abrasion test', while maintaining a hardness value of at least about 9 knoop.

2. The coating composition of claim 1 wherein the binder comprises:
   (i) 5-75% by weight, based on the weight of the binder, of acrylic polymer I, substituted by about 5 to 50% of crosslinkable, aliphatic oligomer;
   (ii) 5-45% by weight, based on the weight of the binder, of self-stabilized dispersion resin; and
   (iii) 20-500% by weight, based on the weight of the binder, of an alkylated melamine formaldehyde crosslinking agent.

3. The coating composition of claim 2 in which acrylic polymer I comprises polymerized monomers of styrene, alkyl methacrylate, alkyl acrylate, hydroxyl alkyl acrylate or methacrylate.

4. The coating composition of claim 3 in which acrylic polymer I comprises polymerized monomers of about 5–30% by weight styrene, 10–40% by weight of butyl methacrylate, 10–40% by weight of butyl acrylate and 15–50% by weight of hydroxy ethyl acrylate or hydroxy propyl acrylate and has a weight average molecular weight of about 5,000–15,000, optionally containing about 0.1–5% by weight of acrylic acid or methacrylic acid.

5. The coating composition of claim 2 in which acrylic polymer II comprises polymerized monomers of styrene, alkyl methacrylate, alkyl acrylate, hydroxy alkyl acrylate or methacrylate and acrylic acid or methacrylic acid.

6. The coating composition of claim 5 in which acrylic polymer II is post reacted with glycidyl methacrylate.

7. The coating composition of claim 5 in which the acrylic polymer II comprises 5–25% by weight styrene, 20–40% by weight butyl methacrylate, 20–40% by weight butyl acrylate, 5–15% by weight hydroxy ethyl acrylate, 1–5% by weight acrylic acid, 10–20% by weight ethyl methacrylate and having a weight average molecular weight of about 7,000–15,000.

8. The coating composition of claim 6 in which the acrylic polymer II comprises 5–25% by weight styrene, 25–35% by weight butyl methacrylate, 20–40% by weight butyl acrylate, 5–25% by weight hydroxy ethyl acrylate, 1–5% by weight acrylic acid, 10–20% by weight ethyl methacrylate and 1–5% by weight of glycidyl methacrylate post reacted with acrylic acid and having a weight average molecular weight of 7,000 to 15,000.

9. The coating composition of claim 2 in which the monomers of the self-stabilized dispersion resin comprise styrene, methyl methacrylate, hydroxy ethyl acrylate, methacrylic acid, methyl acrylate and glycidyl methacrylate; containing in addition about 0.1–2% by weight, based on the weight of the coating composition, of an acid catalyst and about 0.1 to 5% by weight of binder of an ultraviolet light stabilizer; and having an alkylated melamine formaldehyde crosslinking agent which is about 50% methylated and 50% butylated.

10. The coating composition of claim 1 which comprises 50–80% by weight of film-forming binder and 20–50% by weight of an organic solvent for the binder; wherein the binder comprises about
   (i) 5–75% by weight of a solution acrylic Polymer I consisting essentially of about 5–30% by weight styrene, 10–40% by weight butyl methacrylate, 10–40% by weight butyl acrylate or hydroxy propyl acrylate and having a weight average molecular weight of about 5,000–15,000;
   (ii) 5–45% by weight of a self stabilized dispersed resin formed by polymerizing in solution the following constituents:
      (a) an acrylic solution Polymer II consisting essentially of 5–25% by weight styrene, 20–40% by weight butyl acrylate, 20–40% by weight butyl methacrylate, 5–25% by weight hydroxy ethyl acrylate, 1–5% by weight acrylic acid 10–20% by weight ethyl methacrylate and having a weight average molecular weight of about 7,000–15,000;

(b) monomers of styrene, methyl methacrylate hydroxy ethyl acrylate, methacrylic acid, methyl acrylate and glycidyl methacrylate;

(c) an acrylic solution polymer II wherein the carboxyl groups of the acrylic acid monomers are post reacted with glycidyl methacrylate;

(iii) 25–40% by weight of a fully methylated and butylated melamine formaldehyde crosslinking agent.

11. A coating composition according to claim 2 in which the oligomer adduct is formed from caprolactone and hydroxyethyl cyanuric acid, or from the reaction product of a multifunctional alcohol reacted with monomeric anhydride and further reacted with monofunctional epoxy.

12. The coating composition of claim 11 in which the oligomer is an adduct of caprolactone and hydroxyethyl cyanuric acid.

13. The coating composition of claim 12 in which the oligomer is formed from a 4:1 mol ratio of epsilon caprolactone to 1,3,5-tris(2-hydroxyethyl) cyanuric acid.

14. A coating composition according to claim 1 having a color value less than APHA 50 comprising 0.1 to 2 percent, based on the weight of oligomeric adduct solids, of at least one of 9,10-dihydro-9-oxa-10-phosphaphenanthrene-10-oxide.

15. A method for lowering color values in the clearcoat composition according to claim 1, comprising adding thereto from 0.1 to 2 percent by weight, based on the weight of oligomeric adduct solids, of at least one of 9,10-dihydro-9-oxa-10-phosphaphenanthrene-10-oxide and triphenyl phosphite.

16. A substrate coated with a cured layer of the composition of claim 1.

17. A substrate coated with a layer of a pigmented paint composition and having a layer in adherence to thereto of the composition of claim 1.

* * * * *

UNITED STATES PATENT AND TRADEMARK OFFICE
CERTIFICATE OF CORRECTION

PATENT NO. : 5,747,590

DATED : May 5, 1998

INVENTOR(S) : Corcoran et al.

It is certified that error appears in the above-identified patent and that said Letters Patent is hereby corrected as shown below:

Claim 2, Column 10, line 3, "20-500%" should be deleted and inserted therefor -- 20-50% --.

Signed and Sealed this

Twenty-fifth Day of May, 1999

Attest:

Q. TODD DICKINSON

*Attesting Officer*    *Acting Commissioner of Patents and Trademarks*